United States Patent Office 2,818,227
Patented Dec. 31, 1957

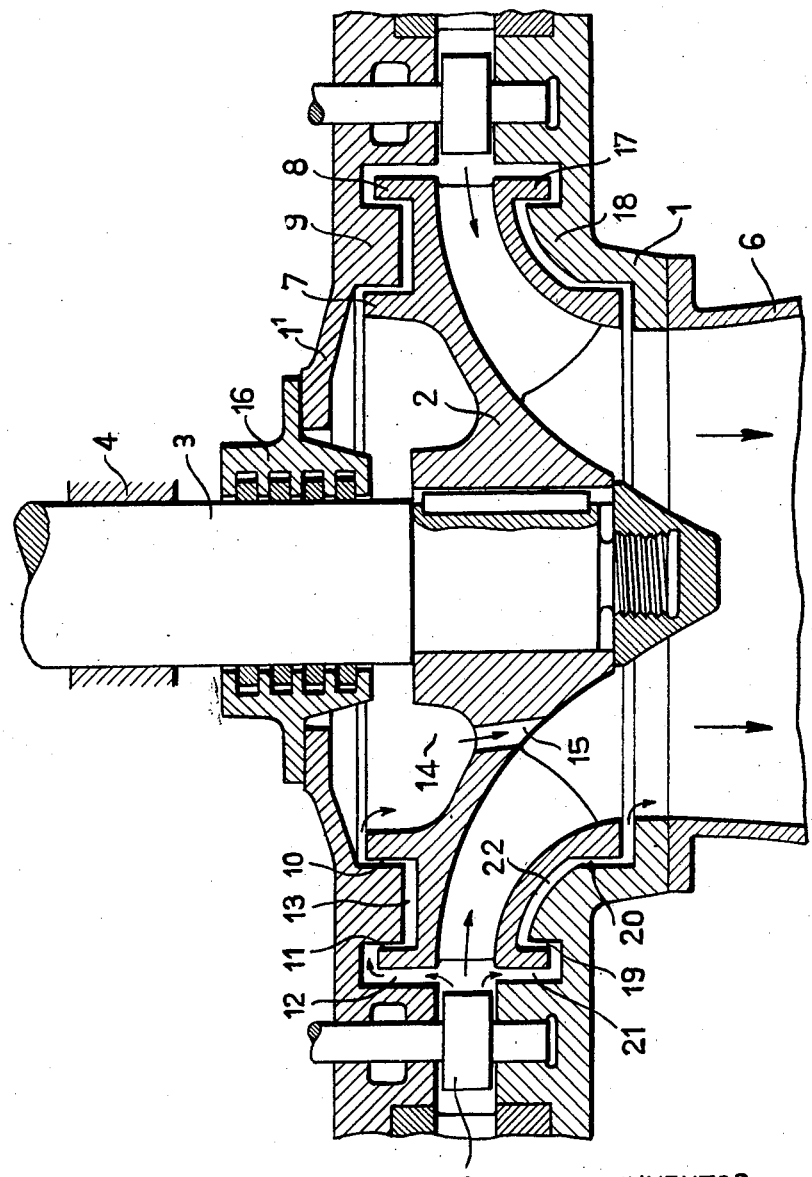

2,818,227

VIBRATION PREVENTING SEALING SYSTEM FOR HYDRAULIC MACHINES

Arnold Süss, Zurich, Switzerland, assignor to Escher Wyss Aktiengesellschaft, Zurich, Switzerland, a corporation of Switzerland Application September 30, 1954, Serial No. 459,318

Claims priority, application Switzerland October 17, 1953

5 Claims. (Cl. 253—26)

This invention relates to a labyrinth packing system comprising at least two annular clearances for use in a hydraulic turbine or pump.

In Francis turbines and pumps, labyrinth packing systems having two or more annular clearances are generally provided to pack the runners. Such runners sometimes tend to vibrate in operation, which may result in grazing of the runner in the narrow gaps of the labyrinth and consequently in pitting of the clearance rings. The vibrations also result in higher temperatures in the guide bearings of the turbine shaft and increased wear at the bearing points, as also in additional stressing of the shaft.

The present invention has for its object to counteract such vibrations and to produce steady running of the turbine or pump. For this purpose, in a packing system comprising at least two annular clearances for a turbine or pump runner, the clearances are so arranged in accordance with the invention that when the runner is deflected from its axial central position, pressure variations which counteract the deflection of the runner are set up in the leakage flow path as a result of variation of the clearance widths.

A constructional example of a packing system according to the invention is illustrated in the accompanying drawing in which the single figure is an axial section through the runner and housing of a Francis turbine.

The turbine illustrated comprises a runner 2 surrounded by a housing consisting of the parts 1 and 1¹, the said runner being mounted overhung on a shaft 3. 4 is the guide bearing of this shaft. After flowing through a system of guide vanes 5, the water enters the runner from the outside and leaves it downwardly in the direction of the axis of the machine through a suction tube 6, which is only partially illustrated.

The runner consists of an annular series of vanes having fluid passages therebetween and opposite end walls, i. e. a hub and a rim which confine said passages. The runner hub has two annular projections 7 and 8 which, with an annular projection 9 on the housing part 1¹, define two contracted passages formed by annular radial clearances 10 and 11. The leakage water flows from the inlet side of the runner through a relatively wide clearance 12 into the clearance 11, and then into an enlarged annular space 13, whereafter it flows through the clearance 10 and a space 14 and then flows away through an aperture 15 extending through the runner hub in the direction of the suction tube. The interior 14 of the housing is sealed from the outside at the shaft by a stuffing box 16.

The runner rim further has an annular projection 17 which, with an adjacent annular extension 18 on the housing, defines an annular radial sealing clearance 19. In addition, the inner part of the runner rim leaves an annular radial clearance 20 free towards the housing. On the side of the runner rim, the leakage water first flows through a relatively wide clearance 21, and then through the contracted passage formed by the clearance 19 into an enlarged passage formed by an annular space 22 surrounding the runner, and leaves this space in the direction of the suction tube by way of the clearance 20.

The leakage fluid is throttled by the annular clearances 11, 10 and 19, 20.

The annular clearance 19 forms the inlet aperture of the annular space 22 which surrounds the runner and through which the leakage water flows, while the annular clearance 20 which is axially spaced from the annular clearance 19 forms the outlet aperture of the space 22. The clearances 19 and 20 are narrower than the clearance 21 situated between the outer periphery of the runner and the housing.

When the runner is centrally positioned in relation to the axis of the machine, the clearances 19 and 20 have the same width along their entire periphery. On the other hand, if the runner is deflected from its central position for any reason, these clearances become wider on one side, while they become narrower on the other side. If it is assumed, for example, that the runner 2 moves out of its central position by a small amount to the left, the clearance 19 opens out on the left-hand side, while the clearance 20 closes. This has the result that the quantity of leakage water which flows away on this side of the runner rim undergoes a smaller pressure drop in the clearance 19 than when the runner is centrally positioned, while the pressure drop in the clearance 20 on this side increases. Consequently, a pressure increase occurs in the annular space 22 at the points of the runner which move away from the axis of the machine. The surface which bounds the runner from the annnular space 22 is so arranged that on a pressure increase in the annular space 22 an additional force is exerted which pushes the runner towards the axis and consequently counteracts the deflection of the runner from its axial central position.

In addition, upon displacement of the runner to the left, the inlet clearance 19 on the right-hand side is decreased, while the outlet clearance 20 is increased. This thus results in a pressure reduction in the annular space 22 on the right-hand side of the runner, so that in addition to the pressures obtaining in the normal position of the runner, forces are set up which also urge the runner towards the right-hand side, this is to say, counteract the deflection of the runner.

The same applies to the deflection of the runner in any other direction. The pressure variations set up always act in the sense of a return of the runner into its axial central position.

A prerequisite for the said effect is naturally that the annular space 22 should not be so wide that rapid pressure equalisation occurs along the periphery. However, it is to be noted that relatively small forces are sufficient to stabilise the runner in its central position, so that the desired effect is still ensured even in the event of a partial pressure equalisation owing to annular flows in the space 22.

The compressive forces acting on the runner rim in the annular space 22 may be analysed into radial and axial force components. The radial force components act fully in the sense of a stabilisation of the runner. On the other hand, in the event of the wheel being deflected to the left, whereby a pressure increase occurs on the left-hand side and a pressure reduction on the right-hand side in the annular space, axial force components are also set up which act upwardly on the left-hand side and downwardly on the right-hand side. These forces combine to give a moment which rotates in the clockwise direction and would thus increase the deflection of the runner which is fixed overhung to the shaft. The axial components of the additional forces therefore act in the wrong sense and reduce the favourable effect of the radial force components.

This unfavourable action is compensated by appropriately arranging the packing system on the hub side. The clearances 10 and 11 are here again narrow in relation to the outer clearance 12. In the event of a deflection of the runner to the left, the clearance 11 on the inlet side is enlarged, while the clearance 10 on the outlet side is narrowed. A pressure increase thus takes place in the annular space 13 on the left-hand side of the runner. On the right-hand side of the runner, the reverse again occurs, that is to say, the clearance 11 closes, while the clearance 10 opens. The admission of the leakage water to the space 13 is thus throttled to a greater extent on the right-hand side, and the escape is freed. This results in a pressure reduction in the right-hand part of the annular space 13.

The surface bounding the runner from the annular space 13 is a plane annular surface which is perpendicular to the axis of the machine. On the left-hand side, additional downwardly acting forces are set up owing to the pressure increase, while additional upwardly acting forces are set up on the right-hand side. These forces, in the case of a runner which is fixed overhung to the shaft, act per se in the sense of restoring the axial central position of the runner, without special measures taken on the rim side. In the illustrated examples they are intended to compensate the unfavourably acting axial force components of the rim side. This is achieved by appropriately closing the width and spacing of the packing clearances 10 and 11 whereby the additional forces set up on the hub side substantially equilibrate the axial components of the additional forces acting on the rim side.

In the illustrated labyrinth packing system, the annular clearances 19 and 20 are thus arranged that upon deflection of the runner the annular clearance 19 forming the inlet aperture of the annular space 22 opens at those points of the runner which move away from the axis of the machine, and the annular clearance 20 forming the outlet aperture closes, and the surface by which the runner is bounded from the annular space 22 is so arranged that a pressure increase produced at these points in the annular space counteracts the deflection of the runner. In addition, the two annular clearances 10 and 11 are so situated on the other side of the runner that those components of the additional forces acting on the runner from the annular spaces 13 and 22 owing to the deflection of the runner and to the pressure variations thus set up which act in the direction of the runner axis are substantially equilibrated reciprocally, while the radial components of the additional forces exerted on the runner rim from the annular space 22 in the illustrated example counteract the deflection of the runner.

The described arrangement of the labyrinth packing system is thus that upon deflection of the runner from its axial central position hydraulic forces are set up which counteract this deflection. Vibrations are thus suppressed in the initial stage, whereby steady running of the machine is ensured.

The packing system designed in accordance with the invention can be applied to turbines, as shown, and also to pumps. More specifically, the application thereof to multi-stage pumps which have relatively slender shafts and which may therefore readily tend to vibrate, is also of advantage.

What is claimed is:

1. In a hydraulic machine comprising a housing and a fluid-traversed runner arranged to rotate about an axis within said housing; a labyrinth packing system in the path of leakage fluid between adjacent parts of the housing and the runner, and comprising two coaxial annular radial clearances between adjacent opposed parts of the runner and housing connected in series as to flow of said leakage fluid by an intervening wider passage formed by a non-radial clearance between housing and runner, whereby the leakage flow is successively throttled by said radial clearances and corrective fluid pressures are developed in said wider intervening passage upon transverse displacement of the runner axis; the first of said radial clearances being between an annular surface in the housing and surrounding annular projection on the runner and the second of said annular clearances being defined by a part of the housing which surrounds the adjacent part of the runner.

2. In a hydraulic machine of the type in which a vaned shrouded radial flow runner is fixed on an end of a rotary shaft in overhung relation to a bearing in which the shaft turns, and rotates in a housing which encircles the runner and defines flow paths for hydraulic liquid to react upon the vanes, the improvement which consists in providing that shroud of the runner which is nearest the bearing and also the proximate wall of the housing, with intercalated labyrinth-forming annular projections normally centered on the axis of said shaft and so spaced and dimensioned that an outer annular projection on the runner encircles an annular projection on the housing and affords a first annular flow-throttling clearance, and an inner annular projection on the runner is encircled by an annular projection on the housing and affords a second annular flow-throttling clearance, the spacing affording an annular reaction chamber of significant radial extent in which hydraulic pressure may react between the runner and the housing in directions parallel with the shaft axis, the specified parts being so arranged that a leakage path is defined through the first throttling clearance, then through the reaction chamber and then through the second throttling clearance to discharge, whereby incipient displacement of the runner transversely to its axis develops, by reverse changes of throttling clearance at opposite sides of the runner, corrective changes of pressure in diametrically opposite portions of the annular reaction chamber.

3. A hydraulic machine as defined in claim 2 in which that shroud of the runner which is remote from said bearing is generally conical in form, and it and the opposed wall of the housing are provided with intercalated labyrinth-forming annular portions normally centered on the axis of said shaft, so arranged that an outer annular projection on the runner encircles an annular projection on the housing and affords a third annular flow-throttling clearance and the annular rim of said remote shroud is encircled by a portion of the housing to afford a fourth annular flow-throttling clearance, said rim being smaller in diameter than said outer annular projection and located in a plane normal to the shaft axis and more remote from said bearing, the arrangement just defined affording a generally conical reaction chamber in which hydraulic pressures develop, between the runner and housing, force reactions which are oblique to the shaft axis, a leakage path being defined through the third clearance, then through the conical reaction chamber and then through the fourth clearance to discharge, whereby components of said oblique force reactions transverse to said shaft tend to correct displacements which change the throttling effects of the third and fourth clearances, and the axial components of the oblique forces are neutralized by the axial forces developed in said annular reaction chamber.

4. In a hydraulic machine comprising a housing and a fluid traversed runner arranged to rotate about an axis within said housing; a labyrinth packing system arranged in the flow path of leakage fluid between adjacent parts of the housing and the runner, said labyrinth packing system comprising two annular throttling passages formed by radial clearances which are left between normally coaxial parts of the runner and the housing; an enlarged passage formed by an annular space situated between said two annular throttling clearances and laterally defined by the housing and the runner, the leakage fluid thereby entering through one of said annular throttling passages into the enlarged passage and being discharged therefrom through the other of said annular throttling passages; said one throttling passage being of the kind in which a displacement of the runner from its axial central position reduces the throttling effect on that side of the runner which moves away from the axis and increases the throttling effect on the opposite side of the runner; and said other annular throttling passage being of the kind in which a displacement of the runner from its axial central position increases the throttling effect on that side of the runner which moves away from the axis and reduces the throttling effect on the opposite side of the runner.

5. In a hydraulic machine comprising a housing and a fluid traversed runner arranged to rotate about an axis within said housing; said runner consisting of a hub and a rim and a series of vanes defining fluid passages between the two; labyrinth packing systems arranged in the flow path of leakage fluid, one being afforded by radial clearance between the hub and adjacent parts of the housing and another by radial clearance between the rim and adjacent parts of the housing; each of said labyrinth packing systems comprising an outer annular throttling passage, an intervening enlarged passage and an inner annular throttling passage through which the leakage fluid flows serially; the outer annular throttling passages having substantially equal diameters and being of the kind in which a displacement of the runner from its axial central position reduces the throttling effect on that side of the runner which moves away from the axis and increases the throttling effect on the opposite side of the runner, and the inner annular throttling passages having substantially equal, but smaller diameters than the outer throttling passages and being of the kind in which a displacement of the runner from its axial central position increases the throttling action on that side of the runner which moves away from the axis and reduces the throttling action on the opposite side; and the inner annular throttling passages of the hub and the rim being to a greater extent axially spaced than the outer annular throttling passages of the rim and the hub.

References Cited in the file of this patent
UNITED STATES PATENTS

| | | |
|---|---|---|
| 1,047,134 | Oesterlen | Dec. 10, 1912 |
| 1,137,948 | Buehle | May 4, 1915 |
| 1,183,066 | Felthousen | May 16, 1916 |
| 1,693,600 | Grant | Dec. 4, 1928 |

FOREIGN PATENTS

| | | |
|---|---|---|
| 137,558 | Switzerland | Jan. 15, 1930 |